(12) United States Patent
Lapidot et al.

(10) Patent No.: US 12,522,800 B2
(45) Date of Patent: Jan. 13, 2026

(54) BACTERIAL CULTURES FOR INCREASING VITAMIN B12 IN PLANTS

(71) Applicant: Hinoman Ltd., Rishon LeZion (IL)

(72) Inventors: Miri Lapidot, Lehavim (IL); Ilan Sela, Ein HaBesor (IL); Monica Colt, Rehovot (IL)

(73) Assignee: Hinoman Ltd., Netivot (IL)

( * ) Notice: Subject to any disclaimer, the term of this patent is extended or adjusted under 35 U.S.C. 154(b) by 382 days.

(21) Appl. No.: 17/801,604

(22) PCT Filed: Feb. 25, 2021

(86) PCT No.: PCT/IL2021/050213
§ 371 (c)(1),
(2) Date: Aug. 23, 2022

(87) PCT Pub. No.: WO2021/171294
PCT Pub. Date: Sep. 2, 2021

(65) Prior Publication Data
US 2023/0332097 A1    Oct. 19, 2023

Related U.S. Application Data

(60) Provisional application No. 62/982,124, filed on Feb. 27, 2020.

(51) Int. Cl.
*C12N 1/20* (2006.01)
(52) U.S. Cl.
CPC ..................... *C12N 1/20* (2013.01)
(58) Field of Classification Search
CPC .......................................................... C12N 1/20
See application file for complete search history.

(56) References Cited

U.S. PATENT DOCUMENTS

| | | | |
|---|---|---|---|
| 2,923,666 | A | 2/1960 | Stern et al. |
| 5,538,888 | A | 7/1996 | Asahi et al. |
| 5,545,538 | A | 8/1996 | Asahi et al. |
| 5,955,321 | A | 9/1999 | Bijl |
| 2007/0212772 | A1 | 9/2007 | Hill |
| 2018/0127794 | A1 | 5/2018 | Glukhman |

FOREIGN PATENT DOCUMENTS

WO    WO 2021/171294    9/2021

OTHER PUBLICATIONS

International Search Report and the Written Opinion Dated May 27, 2021 From the International Searching Authority Re. Application No. PCT/IL2021/050213. (13 Pages).
Kittiwongwattana et al. "*Rhizobium paknamense* Sp. Nov., Isolated From Lesser Duckweeds (*Lemna aequinoctialis*)", International Journal of Systematic and Evolutionary Microbiology,63(10):3823-3828, Oct. 1, 2013.
Watanabe et al. "Vitamin B12 Sources and Microbial Interaction", Experimental Biology and Medicine 243(2):148-158, Dec. 7, 2017.
Office Action Dated Oct. 11, 2023 From the Israel Patent Office Re. Application No. 295910. (4 Pages).

*Primary Examiner* — Louise W Humphrey
*Assistant Examiner* — Rachel Emily Martin

(57) ABSTRACT

A bacterial culture is disclosed which comprises *Rhizobium* bacteria having a nucleic acid sequence at least 99% identical to the nucleic acid sequence as set forth in SEQ ID NO: 1. Uses thereof are also disclosed.

9 Claims, 4 Drawing Sheets

Specification includes a Sequence Listing.

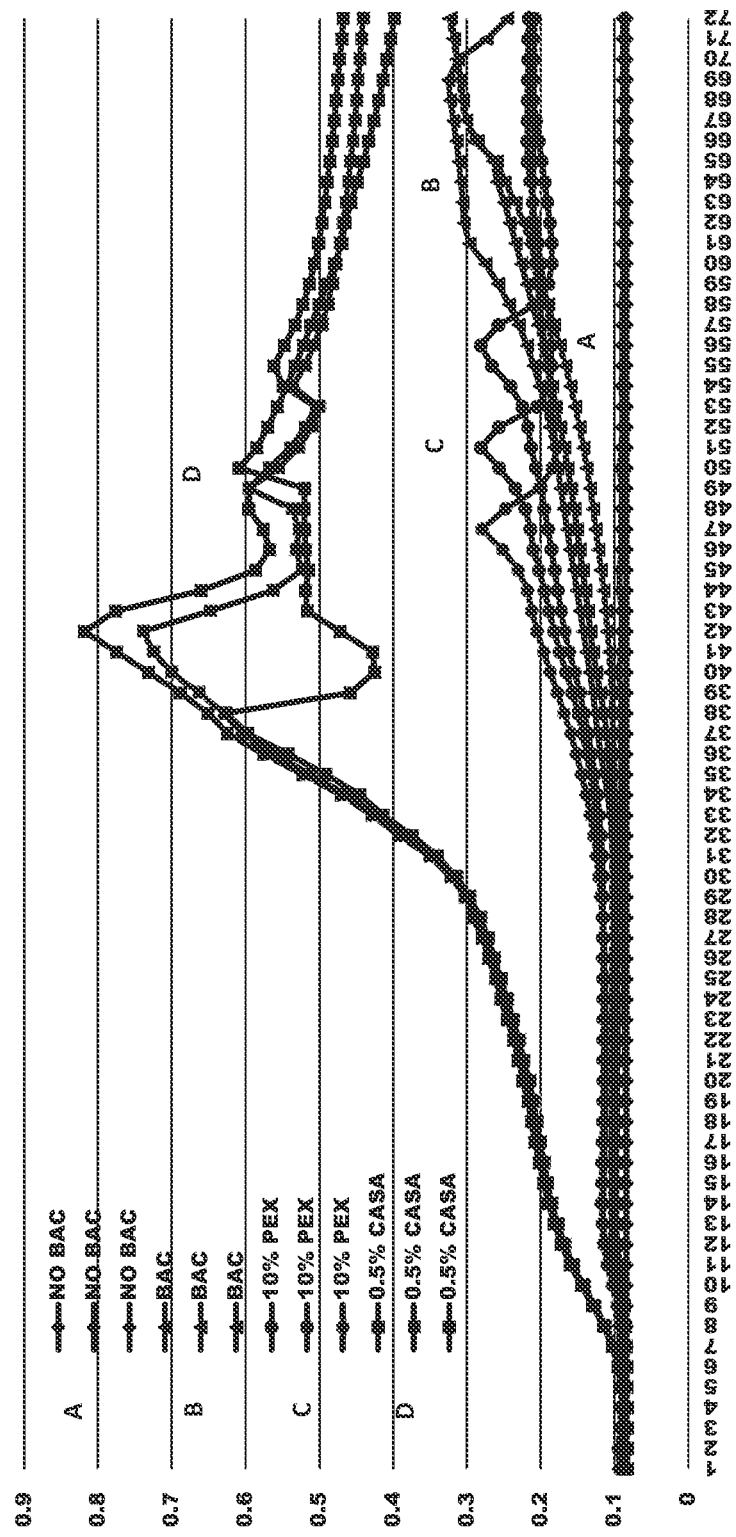

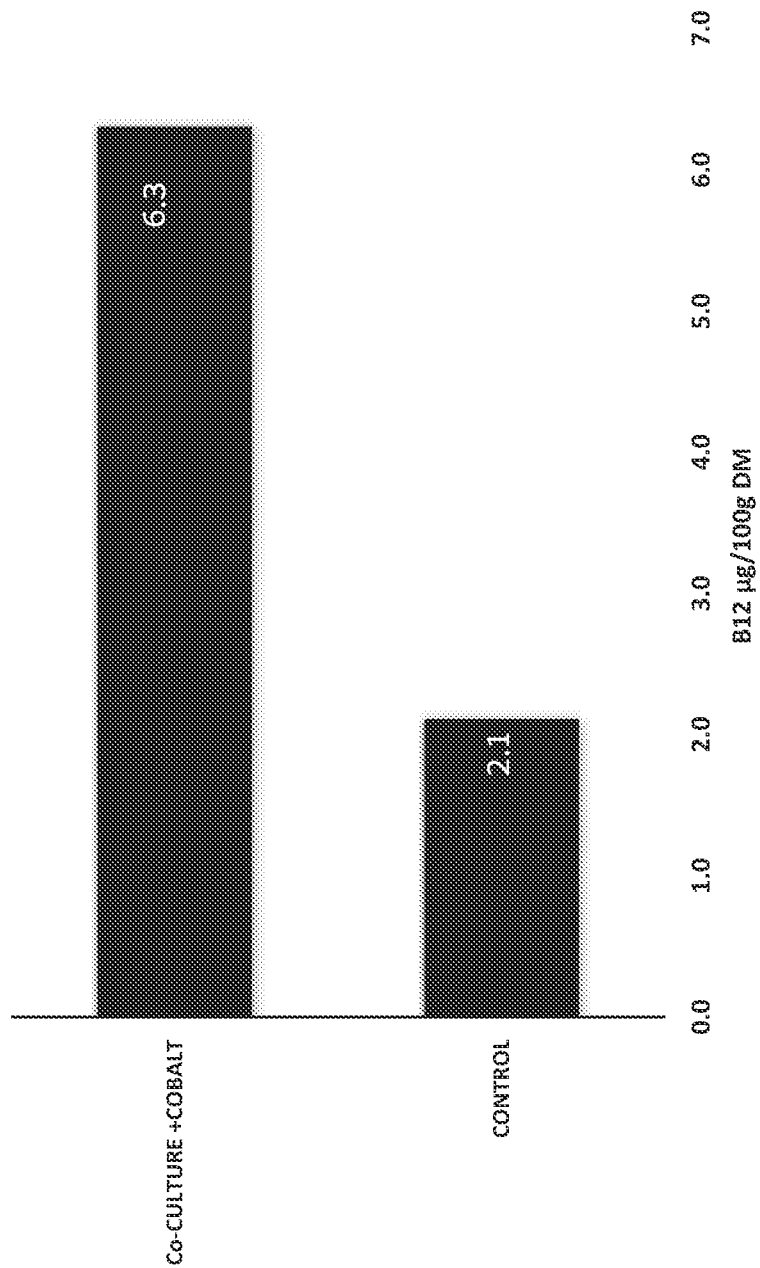

BACTERIAL CULTURES FOR INCREASING VITAMIN B12 IN PLANTS

RELATED APPLICATIONS

This application is a National Phase of PCT Patent Application No. PCT/IL2021/050213 having International filing date of Feb. 25, 2021, which claims the benefit of priority under 35 USC § 119 (e) of U.S. Provisional Patent Application No. 62/982,124 filed on Feb. 27, 2020. The contents of the above applications are all incorporated by reference as if fully set forth herein in their entirety.

SEQUENCE LISTING STATEMENT

The ASCII file, entitled 93655Sequence Listing.txt, created on Aug. 23, 2022, comprising 2,296 bytes, submitted concurrently with the filing of this application is incorporated herein by reference. The sequence listing submitted herewith is identical to the sequence listing forming part of the international application.

FIELD AND BACKGROUND OF THE INVENTION

The present invention, in some embodiments thereof, relates to bacterial cultures for increasing the amount of vitamin B12 in plants and, more particularly, but not exclusively, to duckweed (Lemnaceae) plants, and especially to the *Wolffia* genus.

*Wolffia* are minute monocotyledonous plants of the family Lemnaceae described in details in Landolt E. (1986) The family of Lemnaceae—A monographic study, Vol 1. Veroeffentlichungen des Geobotanischen Institutes der ETH, Stiftung Ruebel, Zurich. pp. 566; and Landolt E, Kandeler R. (1987); The family of Lemnaceae—A monographic study, Vol 2. Veroeffentlichungen des Geobotanischen Institutes der ETH, Stiftung Ruebel, Zurich. pp. 638. Briefly, they measure 0.4 mm to 2.5 mm in size. The majority of Lemnaceae species grow on the surface of fresh water bodies. A few species of *Lemna* (*L. trisulca, L. tenera,* and *L. valdiviana*) and most species of Wolffiella can grow submerged. All known species of the genus *Wolffia* are gibbous and float unattached on fresh water surfaces. Under adverse conditions (crowding or other stresses) some *Wolffia* species, such as *W. globosa*, form true turions and sink to the bottom of the water column in a non-growing, hibernational state.

*Wolffia globosa* has a severely reduced anatomy; it is essentially a rootless thalus. While the species is capable of flowering, it normally grows strictly vegetatively, daughter plants arise by budding, yielding genetically uniform clones. Under permissive conditions, vegetative log phase growth is nearly exponential, resulting in biomass doubling times of approximately 2-3 days. A high percentage of the plant solute is protein. The plant is likewise rich in vitamins and minerals, and is edible by domesticated animals and man. These characteristics position *W. globosa* as an attractive plant for agrotechnological exploitation.

US Patent Application No. 20180127794 teaches bacterial inoculation of *W. globosa* to increase the amount of vitamin B12 produced therein.

U.S. Pat. No. 5,545,538 teaches bacteria of the *Rhizobium* genus generate vitamin B12.

SUMMARY OF THE INVENTION

According to an aspect of the present invention, there is provided a bacterial culture comprising *Rhizobium* bacteria having a nucleic acid sequence at least 99% identical to the nucleic acid sequence as set forth in SEQ ID NO: 1.

According to embodiments of the present invention, the culture further comprises an agriculturally acceptable carrier.

According to an aspect of the present invention, more than 90% of the bacteria of the bacterial culture is the *Rhizobium* bacteria.

According to embodiments of the present invention, the agriculturally acceptable carrier comprises comprising at least one agent selected from the group consisting of a stabilizer, a tackifier, a preservative, a carrier, a surfactant, an anticomplex agent and a combination thereof.

According to embodiments of the present invention, the culture is lyophilized.

According to an aspect of the present invention, there is provided a conditioned medium of *Rhizobium* bacteria having a nucleic acid sequence at least 99% identical to the nucleic acid sequence as set forth in SEQ ID NO: 1.

According to an aspect of the present invention, there is provided an article of manufacture comprising *Rhizobium* bacteria which comprise a nucleic acid sequence at least 99% identical to the nucleic acid sequence as set forth in SEQ ID NO: 1 and an agent which promotes the growth of a plant.

According to embodiments of the present invention, the agent is selected from the group consisting of a fertilizer, an acaricide, a fungicide, an insecticide, a nematicide, a pesticide, a plant growth regulator, a rodenticide and a nutrient.

According to an aspect of the present invention, there is provided a plant or part thereof comprising heterologous *Rhizobium* bacteria which comprise a nucleic acid sequence at least 99% identical to the nucleic acid sequence as set forth in SEQ ID NO: 1, wherein an amount of vitamin B12 comprised within the plant or part thereof is at least twice the amount as compared to a control identical plant which does not comprise the *Rhizobium* bacteria.

According to embodiments of the present invention, the plant is a crop plant.

According to embodiments of the present invention, the crop plant is a cultivated crop plant.

According to embodiments of the present invention, the plant is a monocot.

According to embodiments of the present invention, the plant is a dicot.

According to an aspect of the present invention, there is provided a plant or part thereof comprising *Rhizobium* bacteria which comprise a nucleic acid sequence at least 99% identical to the nucleic acid sequence as set forth in SEQ ID NO: 1, wherein when the plant is of the Lemnoideae family, the *Rhizobium* bacteria is present at a concentration greater than $10^2$ CFU or spores per mg of dried plant.

According to embodiments of the present invention, the plant is of the *Wolffia* genus.

According to embodiments of the present invention, the plant is of a species selected from the group consisting of *Wolffia angusta, Wolffia arrhiza, Wolffia australiana, Wolffia borealis, Wolffia brasiliensis, Wolffia columbiana, Wolffia cylindracea, Wolffia elongata, Wolffia globosa, Wolffia microscopica* and *Wolffia neglecta*.

According to embodiments of the present invention, the plant is of the species *Wolffia globosa*.

According to embodiments of the present invention, the part is selected from the group consisting of a root, a bulb, a frond, a seed, a seedling, a leaf, a flower and a branch.

According to an aspect of the present invention, there is provided a processed product comprising the plant or part thereof of any one of claims of the current invention.

According to embodiments of the present invention, the processed product is flour or a dough.

According to an aspect of the present invention, there is provided a plant seed coated with *Rhizobium* bacteria which comprise a nucleic acid sequence at least 99% identical to the nucleic acid sequence as set forth in SEQ ID NO: 1.

According to embodiments of the present invention, the *Rhizobium* bacteria is present on the seed at a concentration of at least $10^2$ CFU per 1 g of seed.

According to an aspect of the present invention, there is provided a duckweed frond coated with *Rhizobium* bacteria which comprise a nucleic acid sequence at least 99% identical to the nucleic acid sequence as set forth in SEQ ID NO: 1, wherein the *Rhizobium* bacteria is present on the frond at a concentration of at least $10^2$ CFU per 100 mg of frond.

According to an aspect of the present invention, there is provided a method of increasing the amount of vitamin B12 in a plant comprising:
  (a) applying to the plant an effective amount of *Rhizobium* bacteria which comprise a nucleic acid sequence at least 99% identical to the nucleic acid sequence as set forth in SEQ ID NO: 1; and
  (b) growing the plant, thereby increasing the amount of vitamin B12 in the plant.

According to embodiments of the present invention, the applying is selected from the group consisting of spraying, immersing, coating, encapsulating and dusting.

According to embodiments of the present invention, the method further comprises measuring the amount of vitamin B12 in the plant following the growing.

According to an aspect of the present invention, there is provided a method of preventing or treating a disease associated with a low level of vitamin B12 in a subject comprising administering to the subject a therapeutically effective amount of the plant of claims of the current invention, or the processed product of claims of the current invention, thereby treating the disease.

According to embodiments of the present invention, the disease is anemia.

According to an aspect of the present invention, there is provided a method of generating vitamin B12 comprising:
  (a) providing a bacterial culture comprising *Rhizobium* bacteria having a nucleic acid sequence at least 99% identical to the nucleic acid sequence as set forth in SEQ ID NO: 1;
  (b) culturing the bacterial culture under conditions that generate vitamin B12.

According to embodiments of the present invention, more than 90% of the bacteria of the bacterial culture is the *Rhizobium* bacteria.

According to embodiments of the present invention, the method further comprises isolating the vitamin B12 following the culturing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-B are graphs illustrating the growth dynamics of *R. hinomanis* (A) and *E. coli* (B) in Hoagland medium (B-group), supplemented with 0.5% Casamino acids (D-group) and supplemented with 10% *Wolffia globosa* 'Mankai' (Mankai™) extract (C-group). While Casamino acids contributed to both strains equally, the Mankai™ extract promoted the growth of *R. hinomanis* only.

FIG. 3 is a bar graph illustrating the effect of *Rhizobium hinomanis* in a duckweed-bacteria co-culture on the B12 level in *Wolffia globosa* 'Mankai' biomass.

DESCRIPTION OF SPECIFIC EMBODIMENTS OF THE INVENTION

The present invention, in some embodiments thereof, relates to bacterial cultures for increasing the amount of vitamin B12 in plants and, more particularly, but not exclusively, to duckweed (Lemnaceae) plants, and especially to the *Wolffia* genus.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Duckweed aquaculture has been regarded as a potential technology for various commercial applications including for food applications. Cultivated Mankai™ (*Wolffia globosa* 'Mankai') has been shown to be a reliable wholesome nutritional source for whole proteins, dietary fibers, minerals and vitamins.

During cultivation, the present inventors found that Mankai™ contains a stable level of vitamin B12. This finding was unexpected, since vitamin B12 usually is not found in plant-based foods as it is only synthesized by a select subset of bacteria and archaea.

Figure 2:
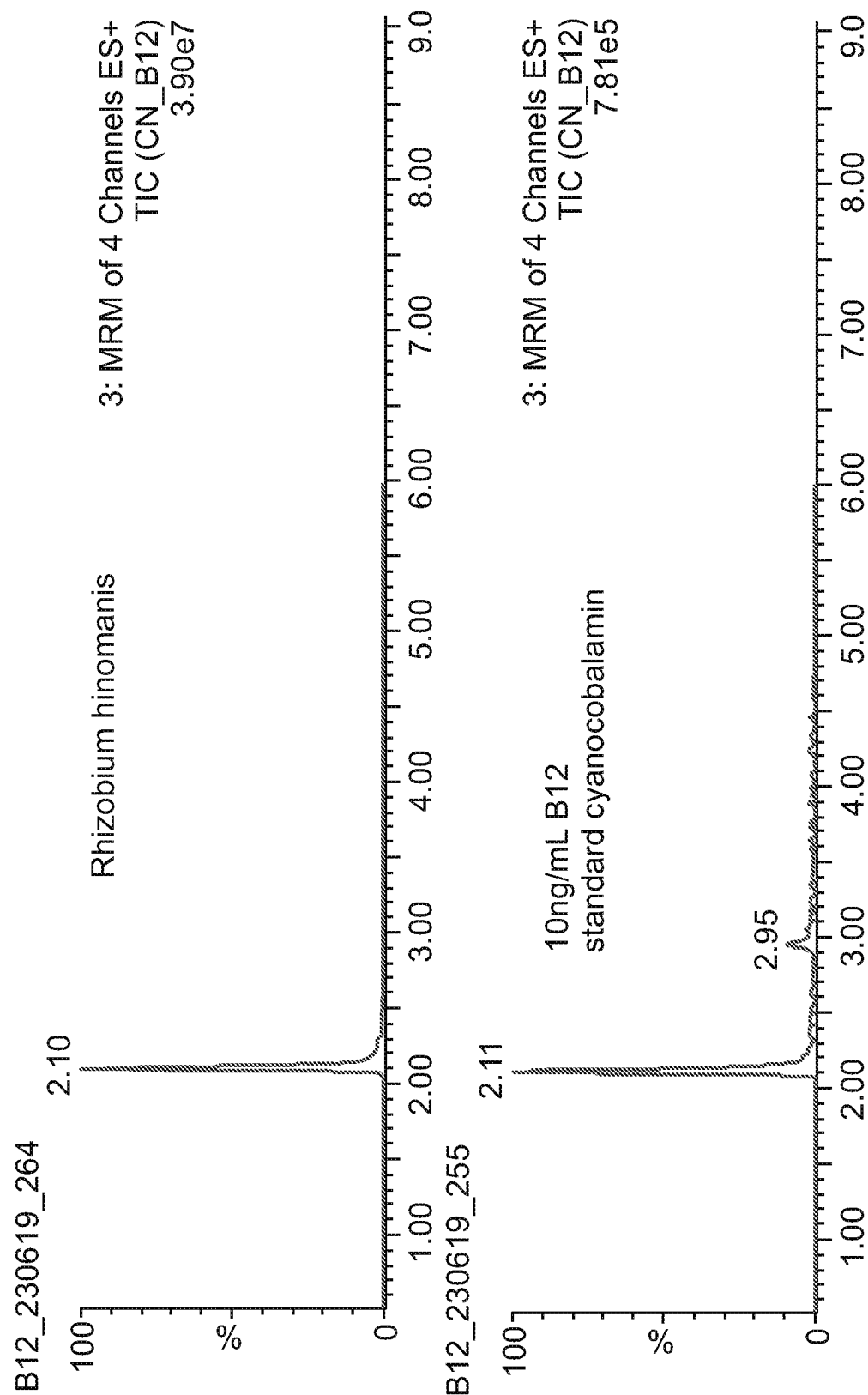
FIG. 2—Vitamin B12 analysis of bacterial extract by UPLC-MS/MS. Retention time of vitamin B12 extraction from *rhizobium* pellet (top) was similar to cobalamin standard (Bottom).

The present inventors isolated bacteria from cultivated Mankai™ fronds, following surface disinfection, and determined the vitamin B12 content of selected strains. Sequence analysis of one of the isolated strains revealed a new strain of *Rhizobium* bacteria. To evaluate its ability to produce vitamin B12, the novel strain was grown in a B12-free medium under axenic culture conditions and was found to produce B12 at a level of approximately 250 µg/100 g bacterial pellet, based on the standard microbiological assay for B12. UPLC-MS/MS was used to confirm the presence of vitamin B12, as shown in FIG. 2.

Furthermore, co-culture of the novel bacteria with Mankai™ increased the amount of vitamin B12 by more than three-fold compared to the amount of vitamin B12 produced in a Mankai™ culture cultured under identical conditions, but in the absence of the bacteria (FIG. 3)

Consequently, the present teachings suggest that the novel *Rhizobium* strain may be used to elevate the amount of vitamin B12 in plants.

Thus, according to a first aspect of the present invention, there is provided a bacterial culture comprising *Rhizobium* bacteria having a nucleic acid sequence at least 99% identical to the nucleic acid sequence as set forth in SEQ ID NO: 1.

The *Rhizobium* bacteria of this aspect of the present invention comprises a 16S nucleic acid sequence which is at least 99%, at least 99.05%, at least 99.1%, at least 99.2%, at least 99.3%, at least 99.4%, at least 99.5%, at least 99.6%, at least 99.7%, at least 99.8%, at least 99.8%, at least 99.9%, at least 99.95%, at least 99.99%, at least 99.999%, at least 99.9999%, at least 99.99999%, at least 99.999999% identical to the nucleic acid sequence as set forth in SEQ ID NO: 1.

As used herein, "sequence identity" or "identity" or grammatical equivalents as used herein in the context of two nucleic acid or polypeptide sequences includes reference to the residues in the two sequences which are the same when aligned. When percentage of sequence identity is used in reference to proteins it is recognized that residue positions which are not identical often differ by conservative amino acid substitutions, where amino acid residues are substituted for other amino acid residues with similar chemical properties (e.g. charge or hydrophobicity) and therefore do not change the functional properties of the molecule. Where sequences differ in conservative substitutions, the percent sequence identity may be adjusted upwards to correct for the conservative nature of the substitution. Sequences which differ by such conservative substitutions are considered to have "sequence similarity" or "similarity". Means for making this adjustment are well-known to those of skill in the art. Typically this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., according to the algorithm of Henikoff S and Henikoff J G. [Amino acid substitution matrices from protein blocks. Proc. Natl. Acad. Sci. U.S.A. 1992, 89(22): 10915-9].

Identity can be determined using any homology comparison software, including for example, the BlastN software of the National Center of Biotechnology Information (NCBI) such as by using default parameters.

According to some embodiments of the invention, the identity is a global identity, i.e., an identity over the entire nucleic acid sequences of the invention and not over portions thereof.

As used herein, the phrase "a bacterial culture" refers to a collection of *Rhizobium* bacteria. The culture may be in any form—e.g. fluid, pellet, scraping, dried sample, lyophilisate and may be contained in a support, container, or medium such as a plate, paper, filter, matrix, straw, pipette or pipette tip, fiber, needle, gel, swab, tube, vial, particle, etc.

The disclosed bacteria in the culture are maintained in such a way that they are capable of propagating. Thus, the cultures may be in a variety of forms, including, but not limited to stored stocks of cells (particularly glycerol stocks), frozen cells, agar strips, stored agar plugs in glycerol/water, freeze dried stocks, and dried stocks such as lyophilisate dried onto filter paper.

The culture may further comprise media for propagating the bacteria including for example soil, hydroponic apparatus, and/or artificial growth medium.

The term "growth medium" or "growth media" refers hereinafter to water supplemented with components such as, but not limited to nitrogen, phosphorus, potassium, calcium, iron, zinc, copper, manganese, magnesium, urea, nitrites, nitrates, ammonia, sugars (such as dextrose, glucose, lactose) concentration in the range of about 0.01-3.0% w/v, amino acids and/or peptides and/or vitamins sources (such as yeast extract, enzymatic digest of casein, enzymatic digest of gelatin) in a concentration range of about 0.01-3.0% w/v thereof, amino acids or mixes thereof (such as L-Arginine, L-Cysteine, L-Glutamine, Glycine, L-Histidine, L-Isoleucine, L-Leucine, L-Lysine, L-Methionine, L-Phenylalanine, L-Serine, L-Threonine, L-Tryptophan, L-Tyrosine, L-Valine) in a concentration range of about 0.0001-0.3 g/l, microelements (such as Choline Chloride, Folic Acid, myo-Inositol, Niacinamide, D-Pantothenic Acid hemicalcium, Calcium Chloride, Ferric Nitrate, Magnesium Sulfate, Potassium Chloride, Sodium Chloride, Sodium Phosphate) in a concentration range of about 0.0001-0.3 g/l, vitamins and minerals. According to a particular embodiment, the growth medium comprises cobalt. Exemplary growth media include Hutner; Hoagland-A; Hoagland-B; Pirson; Hoagland-C; Steinberg; Schenk and Hildebrandt, Murashige, and any combination thereof.

The *Rhizobium* bacteria are typically present in the culture in a purity that exceeds that found in nature.

Thus, the present inventors contemplate that more than 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, of the bacteria of the total bacteria of the bacterial culture is the novel *Rhizobium* bacteria disclosed herein.

The culture of this aspect of the present invention preferably does not comprise soil and is substantially devoid of plant material.

According to a specific embodiment, the culture comprises 2, 3, 4, 5, 6, 7, 8, 9 or 10 different *Rhizobium* strains. Preferably, the culture does not comprise more than 20, 30, 40 or 50 different *Rhizobium* strains. In one embodiment, the culture comprises only bacterial strains that comprise a 16S nucleic acid sequence which is more than 99% identical to the nucleic acid sequence set forth in SEQ ID NO: 1.

According to another embodiment, the culture comprises no more than 2, 3, 4, 5, 6, 7, 8, 9 or 10 bacterial species.

According to some embodiments of the invention, the culture comprises less than 50, 20, 10, 9, 8, 7, 6, 5, 4 microbial species, e.g., bacteria and fungi.

According to other embodiments, the culture of this aspect of the present invention only comprises bacteria and does not comprise other microbes.

In one embodiment, the culture comprises a single microbial species—i.e. *Rhizobium* bacteria.

In another embodiment, the culture comprises a single microbial strain.

The culture of this aspect of the present invention may further comprise an agriculturally acceptable carrier.

The carrier can include a dispersant, a surfactant, an additive, water, a thickener, an anti-caking agent, residue breakdown, a composting formulation, a granular application, diatomaceous earth, an oil, a coloring agent, a stabilizer, a preservative, a polymer, a coating, or a combination thereof. One of ordinary skill in the art can readily determine the appropriate carrier to be used taking into consideration factors such as a particular bacterial strain, plant to which the bacteria is to be applied, type of soil, climate conditions, whether the bacteria is in liquid, solid or powder form, and the like.

The additive can comprise an oil, a gum, a resin, a clay, a polyoxyethylene glycol, a terpene, a viscid organic, a fatty acid ester, a sulfated alcohol, an alkyl sulfonate, a petroleum sulfonate, an alcohol sulfate, a sodium alkyl butane diamate, a polyester of sodium thiobutant dioate, a benzene acetonitrile derivative, a proteinaceous material, or a combination thereof.

The surfactant can contain a heavy petroleum oil, a heavy petroleum distillate, a polyol fatty acid ester, a polyethoxylated fatty acid ester, an aryl alkyl polyoxyethylene glycol, an alkyl amine acetate, an alkyl aryl sulfonate, a polyhydric alcohol, an alkyl phosphate, or a combination thereof.

The anti-caking agent can include a sodium salt such as a sodium sulfite, a sodium sulfate, a sodium salt of monomethyl naphthalene sulfonate, a sodium salt of dimethyl naphthalene sulfonate, or a combination thereof; or a calcium salt such as calcium carbonate, diatomaceous earth, or a combination thereof.

Any agriculturally acceptable carrier can be used. Such carriers include, but are not limited to, vermiculite, charcoal, sugar factory carbonation press mud, rice husk, carboxymethyl cellulose, peat, perlite, fine sand, calcium carbonate, flour, alum, a starch, talc, polyvinyl pyrrolidone, or a combination thereof.

The cultures can be prepared as solid, liquid or powdered formulations as is known in the art. The cultures of the present invention can be formulated as a seed coating formulation, a liquid formulation for application to plants or to a plant growth medium, or a solid formulation for application to plants or to a plant growth medium.

When the culture is prepared as a liquid formulation for application to plants or to a plant growth medium, it can be prepared in a concentrated formulation or a working form formulation. In some instances, the seed coating formulation of the present invention is an aqueous or oil-based solution for application to seeds.

When the culture of the present invention is prepared as a solid formulation for application to plants or to a plant growth medium, it can be prepared as a granular formulation or a powder agent. The seed coating formulation can be a powder or granular formulation for application to seeds.

The culture can further include an agrochemical (i.e. an agent that promotes the growth of a plant).

Thus, according to another aspect of the present invention there is provided an article of manufacture comprising *Rhizobium* bacteria which comprise a nucleic acid sequence at least 99% identical to the nucleic acid sequence as set forth in SEQ ID NO: 1 and an agent which promotes the growth of a plant.

Examples of agents that promote the growth of a plant include a fertilizer, a micronutrient fertilizer material, an insecticide, a herbicide, a plant growth regulator, an acaricide, a rodenticide, a fungicide, a nutrient, a molluscicide, an algicide, a pesticide, a fungal inoculant, or a combination thereof.

In some instances, the fertilizer is a liquid fertilizer. The agrochemical can either be applied to a plant growth medium or to plants and/or seeds. Liquid fertilizer can include, without limitation, ammonium sulfate, ammonium nitrate, ammonium sulfate nitrate, ammonium chloride, ammonium bisulfate, ammonium polysulfide, ammonium thiosulfate, aqueous ammonia, anhydrous ammonia, ammonium polyphosphate, aluminum sulfate, calcium nitrate, calcium ammonium nitrate, calcium sulfate, calcined magnesite, calcitic limestone, calcium oxide, calcium nitrate, dolomitic limestone, hydrated lime, calcium carbonate, diammonium phosphate, monoammonium phosphate, magnesium nitrate, magnesium sulfate, potassium nitrate, potassium chloride, potassium magnesium sulfate, potassium sulfate, sodium nitrates, magnesian limestone, magnesia, urea, urea-formaldehydes, urea ammonium nitrate, sulfur-coated urea, polymer-coated urea, isobutylidene diurea, $K_2SO_4$-$2MgSO_4$, kainite, sylvinite, kieserite, Epsom salts, elemental sulfur, marl, ground oyster shells, fish meal, oil cakes, fish manure, blood meal, rock phosphate, super phosphates, slag, bone meal, wood ash, manure, bat guano, peat moss, compost, green sand, cottonseed meal, feather meal, crab meal, fish emulsion, or a combination thereof.

The micronutrient fertilizer material can comprise boric acid, a borate, a boron frit, copper sulfate, a copper frit, a copper chelate, a sodium tetraborate decahydrate, an iron sulfate, an iron oxide, iron ammonium sulfate, an iron frit, an iron chelate, a manganese sulfate, a manganese oxide, a manganese chelate, a manganese chloride, a manganese frit, a sodium molybdate, molybdic acid, a zinc sulfate, a zinc oxide, a zinc carbonate, a zinc frit, zinc phosphate, a zinc chelate, or a combination thereof.

The insecticide can include an organophosphate, a carbamate, a pyrethroid, an acaricide, an alkyl phthalate, boric acid, a borate, a fluoride, sulfur, a haloaromatic substituted urea, a hydrocarbon ester, a biologically-based insecticide, or a combination thereof.

The herbicide can comprise a chlorophenoxy compound, a nitrophenolic compound, a nitrocresolic compound, a dipyridyl compound, an acetamide, an aliphatic acid, an anilide, a benzamide, a benzoic acid, a benzoic acid derivative, anisic acid, an anisic acid derivative, a benzonitrile, benzothiadiazinone dioxide, a thiocarbamate, a carbamate, a carbanilate, chloropyridinyl, a cyclohexenone derivative, a dinitroaminobenzene derivative, a fluorodinitrotoluidine compound, isoxazolidinone, nicotinic acid, isopropylamine, an isopropylamine derivative, oxadiazolinone, a phosphate, a phthalate, a picolinic acid compound, a triazine, a triazole, a uracil, a urea derivative, endothall, sodium chlorate, or a combination thereof.

The fungicide can comprise a substituted benzene, a thiocarbamate, an ethylene bis dithiocarbamate, a thiophthalidamide, a copper compound, an organomercury compound, an organotin compound, a cadmium compound, anilazine, benomyl, cyclohexamide, dodine, etridiazole, iprodione, metlaxyl, thiamimefon, triforine, or a combination thereof.

The fungal inoculant can comprise a fungal inoculant of the family Glomeraceae, a fungal inoculant of the family Claroidoglomeraceae, a fungal inoculant of the family Gigasporaceae, a fungal inoculant of the family Acaulosporaceae, a fungal inoculant of the family Sacculosporaceae, a fungal inoculant of the family Entrophosporaceae, a fungal inoculant of the family Pacidsporaceae, a fungal inoculant of the family Diversisporaceae, a fungal inoculant of the family Paraglomeraceae, a fungal inoculant of the family Archaeosporaceae, a fungal inoculant of the family Geosiphonaceae, a fungal inoculant of the family Ambisporaceae, a fungal inoculant of the family Scutellosporaceae, a fungal inoculant of the family Dentiscultataceae, a fungal inoculant of the family Racocetraceae, a fungal inoculant of the phylum Basidiomycota, a fungal inoculant of the phylum Ascomycota, a fungal inoculant of the phylum Zygomycota, or a combination thereof.

In one embodiment, the plant growth regulator is selected from the group consisting of: Abscisic acid, amidochlor, ancymidol, 6-benzylaminopurine, brassinolide, butralin, chlormequat (chlormequat chloride), choline chloride, cyclanilide, daminozide, dikegulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N-6-benzyladenine, paclobutrazol, prohexadione (prohexadione-calcium), prohydrojasmon, thidiazuron, triapenthenol, tributyl phosphorotrithioate, 2,3,5-tri-iodobenzoic acid, trinexapac-ethyl and uniconazole. Other examples of plant growth regulators which can be comprised in the article of manufacture include those based on dichlorophene and benzylalcohol hemi formal (Proxel® from ICI or Acticide® RS from Thor Chemie and Kathon® MK from Rohm & Haas) and isothiazolinone derivatives such as alkylisothiazolinones and benzisothiazolinones (Acticide® MBS from Thor Chemie). Other plant growth regulators that can be incorporated seed coating compositions are described in US 2012/0108431, which is incorporated by reference in its entirety.

Preferred nematode-antagonistic biocontrol agents include ARF18; *Arthrobotrys* spp.; *Chaetomium* spp.; *Cylindrocarpon* spp.; *Exophilia* spp.; *Fusarium* spp.; *Gliocladium* spp.; *Hirsutella* spp.; *Lecanicillium* spp.; *Monacrosporium* spp.; *Myrothecium* spp.; *Neocosmospora* spp.; *Paecilomyces* spp.; *Pochonia* spp.; *Stagonospora* spp.; vesicular-arbuscular mycorrhizal fungi, *Burkholderia* spp.; *Pasteuria* spp., *Brevibacillus* spp.; *Pseudomonas* spp.; and Rhizobacteria. Particularly preferred nematode-antagonistic biocontrol agents include ARF18, *Arthrobotrys oligospora, Arthrobotrys dactyloides, Chaetomium globosum, Cylindrocarpon heteronema, Exophilia jeanselmei, Exophilia pisciphila, Fusarium aspergilus, Fusarium solani, Gliocladium catenulatum, Gliocladium roseum, Gliocladium vixens, Hirsutella rhossiliensis, Hirsutella minnesotensis, Lecanicillium lecanii, Monacrosporium drechsleri, Monacrosporium gephyropagum, Myrotehcium verrucaria, Neocosmospora vasinfecta, Paecilomyces lilacinus, Pochonia chlamydosporia, Stagonospora heteroderae, Stagonospora phaseoli*, vesicular-arbuscular mycorrhizal fungi, *Burkholderia cepacia, Pasteuria penetrans, Pasteuria thornei, Pasteuria nishizawae, Pasteuria ramosa, Pastrueia usage, Brevibacillus laterosporus* strain G4, *Pseudomonas fluorescens* and Rhizobacteria.

In another embodiment, the article of manufacture can comprise a nutrient. The nutrient can be selected from the group consisting of a nitrogen fertilizer including, but not limited to Urea, Ammonium nitrate, Ammonium sulfate, Non-pressure nitrogen solutions, Aqua ammonia, Anhydrous ammonia, Ammonium thiosulfate, Sulfur-coated urea, Urea-formaldehydes, IBDU, Polymer-coated urea, Calcium nitrate, Ureaform, and Methylene urea, phosphorous fertilizers such as Diammonium phosphate, Monoammonium phosphate, Ammonium polyphosphate, Concentrated superphosphate and Triple superphosphate, and potassium fertilizers such as Potassium chloride, Potassium sulfate, Potassium-magnesium sulfate, Potassium nitrate. Such compositions can exist as free salts or ions within the seed coat composition. Alternatively, nutrients/fertilizers can be complexed or chelated to provide sustained release over time.

In one embodiment, the article of manufacture may comprise a rodenticide selected from the group of substances consisting of 2-isovalerylindan-1,3-dione, 4-(quinoxalin-2-ylamino) benzenesulfonamide, alpha-chlorohydrin, aluminum phosphide, antu, arsenous oxide, barium carbonate, bisthiosemi, brodifacoum, bromadiolone, bromethalin, calcium cyanide, chloralose, chlorophacinone, cholecalciferol, coumachlor, coumafuryl, coumatetralyl, crimidine, difenacoum, difethialone, diphacinone, ergocalciferol, flocoumafen, fluoroacetamide, flupropadine, flupropadine hydrochloride, hydrogen cyanide, iodomethane, lindane, magnesium phosphide, methyl bromide, norbormide, phosacetim, phosphine, phosphorus, pindone, potassium arsenite, pyrinuron, scilliroside, sodium arsenite, sodium cyanide, sodium fluoroacetate, strychnine, thallium sulfate, warfarin and zinc phosphide.

The present invention further contemplates a conditioned medium comprising generated from the disclosed *Rhizobium* bacteria.

As used herein the phrase "conditioned medium" refers to a growth medium of a bacterial cell culture following a certain culturing period. The conditioned medium includes growth factors and cytokines secreted by the bacterial cells in the culture.

The conditioned medium is typically substantially devoid of bacterial cells.

Following accumulation of adequate factors in the medium, growth medium (i.e., conditioned medium) is separated from the bacterial cells and collected. It will be appreciated that the bacterial cells can be used repeatedly to condition further batches of medium over additional culture periods, provided that the cells retain their ability to condition the medium.

Preferably, the conditioned medium is sterilized (e.g., filtered using a 20 μm filter). The conditioned medium of some embodiments of the invention may be applied directly to plant cells or extracted to concentrate the effective factor such as by salt filtration. For future use, the conditioned medium may be stored frozen at −80° C.

As mentioned the bacterial strain of the present invention can be used to generate vitamin B12.

Thus, according to another aspect of the present invention there is provided a method of generating vitamin B12 comprising:
(a) providing a bacterial culture comprising *Rhizobium* bacteria having a nucleic acid sequence at least 99% identical to the nucleic acid sequence as set forth in SEQ ID NO: 1;
(b) culturing the bacterial culture under conditions that generate vitamin B12.

The culturing may be effected for a length of time sufficient for generation of the vitamin B12—for example at least 24 hours, at least 48 hours, at least one week or longer. The culturing may be carried out in a growth medium.

Additional agents that can be added to the culture include, but are not limited to cyanide, ALA, DMB, glycine, threonine, or compatible solutes like betaine and choline. Typically, glucose or sucrose is used as a carbon source, although other carbon sources such as maltose syrup and corn steep liquor can also be used.

According to a particular embodiment, the bacteria is cultured in a medium comprising cobalt.

The medium may further comprise exogenously added amino acids (e.g. casaamino acids).

Isolation of vitamin B12 can be carried out as known in the art—see for example Bito et al., J Agric Food Chem. 2016 Nov. 16; 64(45):8516-8524. Epub 2016 Nov. 2, the contents of which are incorporated herein by reference.

The present inventors further contemplate inoculating plants with the bacterial strain disclosed herein so as to increase the amount of vitamin B12 comprised within.

Thus, according to another aspect of the present invention, there is provided a plant or part thereof comprising heterologous *Rhizobium* bacteria which comprise a nucleic acid sequence at least 99% identical to the nucleic acid sequence as set forth in SEQ ID NO: 1, wherein an amount of vitamin B12 comprised within the plant or part thereof is at least twice (or even three times) the amount as compared to a control identical plant which does not comprise the *Rhizobium* bacteria.

According to yet another aspect of the present invention, there is provided a plant or part thereof comprising *Rhizobium* bacteria which comprise a nucleic acid sequence at least 99% identical to the nucleic acid sequence as set forth in SEQ ID NO: 1, wherein when the plant is of the Lemnoideae family, the *Rhizobium* bacteria is present at a concentration greater than $10^2$ CFU or spores per mg of dried plant.

The plant of these aspects of the present invention can be a whole plant or a plant part or a particulate plant material. "Whole" or "essentially intact" plant is to be understood to encompass a plant with its original whole cellular skeletal structure, namely, whole cells (viable or non-viable) without applying any crushing, grinding, powdering etc., of the plant or of at least the plant's fronds; while the term "plant part" or "particulate plant material" or "pieces of plant" is to be understood as referring to a plant after being subjected to at least one processing step that resulted in the disruption of the cellular structure of the plant, for instance, grinding, crushing or subjecting the plant to shear forces, as well subjecting to extraction processes. In some embodiments, the particular plant material encompasses one or more of whole plant cells, fractionated cells and combination of same.

In some further embodiments, the harvested plant material is obtained from fresh, partially dried plant material or essentially fully dried plant material. The harvested material may be whole plant material or processed plant material, e.g. where the cells structure was disrupted.

In one embodiment, the plant is an agricultural plant.

The phrase "agricultural plants", or "plants of agronomic importance", refers to plants that are cultivated by humans for food, feed, fiber, and fuel purposes. In one embodiment, the plant is not a wild plant.

In one embodiment, a monocotyledonous plant is inoculated. Monocotyledonous plants belong to the orders of the Alismatales, Arales, Arecales, Bromeliales, Commelinales, Cyclanthales, Cyperales, Eriocaulales, Hydrocharitales, Juncales, Lilliales, Najadales, Orchidales, Pandanales, Poales, Restionales, Triuridales, Typhales, and Zingiberales. Plants belonging to the class of the Gymnospermae are Cycadales, Ginkgoales, Gnetales, and Pinales. In a particular embodiment, the monocotyledonous plant can be selected from the group consisting of a maize, rice, wheat, barley, and sugarcane.

In another embodiment, a dicotyledonous plant is inoculated, including those belonging to the orders of the Aristochiales, Asterales, Batales, Campanulales, Capparales, Caryophyllales, Casuarinales, Celastrales, Cornales, Diapensales, Dilleniales, Dipsacales, Ebenales, Ericales, Eucomiales, Euphorbiales, Fabales, Fagales, Gentianales, Geraniales, Halorgales, Hamamelidales, Middles, Juglandales, Lamiales, Laurales, Lecythidales, Leitneriales, Magniolales, Malvales, Myricales, Myrtales, Nymphaeales, Papeverales, Piperales, Plantaginales, Plumb aginales, Podostemales, Polemoniales, Polygalales, Polygonales, Primulales, Proteales, Rafflesiales, Ranunculales, Rhamnales, Rosales, Rubiales, Salicales, Santales, Sapindales, Sarraceniaceae, Scrophulariales, Theales, Trochodendrales, Umbellales, Urticales, and Violates. In a particular embodiment, the dicotyledonous plant can be selected from the group consisting of cotton, bean, pepper, and tomato.

Preferably, the plant is an agricultural plant. Agricultural plants include monocotyledonous species such as: maize (*Zea mays*), common wheat (*Triticum aestivum*), spelt (*Triticum spelta*), einkorn wheat (*Triticum monococcum*), emmer wheat (*Triticum dicoccum*), durum wheat (*Triticum durum*), Asian rice (*Oryza sativa*), African rice (*Oryza glabaerreima*), wild rice (*Zizania aquatica, Zizania latifolia, Zizania palustris, Zizania texana*), barley (*Hordeum vulgare*), Sorghum (*Sorghum bicolor*), Finger millet (*Eleusine coracana*), Proso millet (*Panicum miliaceum*), Pearl millet (*Pennisetum glaucum*), Foxtail millet (*Setaria italica*), Oat (*Avena sativa*), Triticale (Triticosecale), rye (*Secale cereal*), Russian wild rye (*Psathyrostachys juncea*), bamboo (Bambuseae), or sugarcane (e.g., *Saccharum arundinaceum, Saccharum barberi, Saccharum bengalense, Saccharum edule, Saccharum munja, Saccharum officinarum, Saccharum procerum, Saccharum ravennae, Saccharum robustum, Saccharum sinense*, or *Saccharum spontaneum*); as well as dicotyledonous species such as: soybean (*Glycine max*), canola and rapeseed cultivars (*Brassica napus*), cotton (genus *Gossypium*), alfalfa (*Medicago sativa*), cassava (genus *Manihot*), potato (*Solanum tuberosum*), tomato (*Solanum lycopersicum*), pea (*Pisum sativum*), chick pea (*Cicer arietinum*), lentil (*Lens culinaris*), flax (*Linum usitatissimum*) and many varieties of vegetables.

According to a particular embodiment, the inoculated plant is of the Lemonoideae subfamily. Exemplary genera of Lemonoideae contemplated by the present invention include *Landoltia, Lemna, Spirodela, Wolffia* and *Woffiella*.

According to a particular embodiment, the plant is of the *Wolffia* genus.

Exemplary species of *Wolffia* genus which may be inoculated with the bacteria of the present invention include *Wolffia angusta, Wolffia arrhiza, Wolffia australiana, Wolffia borealis, Wolffia brasiliensis, Wolffia columbiana, Wolffia cylindracea, Wolffia elongata, Wolffia globosa, Wolffia microscopica* and *Wolffia neglecta*.

According to a particular embodiment, the plant is *Wolffia globosa*.

Such host plants are preferably plants of agronomic importance. It is contemplated that any element, or more than one element, of the host plant may be colonized with the bacterial strain to thus confer the ability to produce vitamin B12 in the plant. The initial inoculated element may additionally be different than the element to which the bacterial strain localizes. The bacteria may localize to different elements of the same plant in a spatial or temporal manner. For example, a seed may be inoculated with the bacteria, and upon germination, the bacteria may localize to root tis sue.

The amount of bacteria that is used to inoculate a plant or to a locus on which the plant or plant part grows (e.g. water) is preferably an amount effective to increase the level of vitamin B12.

As used herein, the term "Vitamin B12" refers to the water soluble vitamin of the cobalamin class. The vitamin B12 may further comprise additional cobalamin compounds that include vitamin B12a (hydroxocobalamin), vitamin B12b (aquacobalamin), vitamin B12c (nitrilocobalamin), methyl B12 (methylcobalamin) Sulfitocobalamin and coenzyme B12 (5'deoxyadenosine cobalamin).

The amount of vitamin B12 in the plant is typically at least twice, 3 times, 4 times, 5 times, 6 times, 7 times, 8 times, 9 times, 10 times or greater than the amount of vitamin B12 in the plant in the absence of the specified bacteria.

Thus for example, the amount of the disclosed bacteria in the plant (e.g. *Wolffia globosa*) is such that there is more than 2.5 µg, 3 µg, 3.5 µg, 4 µg, 4.5 µg, 5 µg, 5.5 µg, 6 µg, 6.5 µg, 7 µg, 7.5 µg, 8 µg, 8.5 µg, 9 µg, 9.5 µg, 10 µg, 15 µg, 20 µg, 25 µg, 30 µg, 35 µg, 40 µg, 45 µg, 50 µg, 55 µg, 60 µg, 65 µg, 70 µg, 75 µg, 80 µg vitamin B12 per 100 g dried plant, as determined by HPLC-MS/MS.

According to embodiments of the present invention sufficient bacteria of the strain disclosed herein is used to inoculate the plant (e.g. *Wolffia globosa*) such that the plant comprises at least $10^2$ CFU per g of dried plant, $10^3$ CFU per g of dried plant, $10^4$ CFU per g of dried plant.

Any part of the plant may be inoculated with the bacteria of the present invention, including but not limited to a whole plant, seedling, meristematic tissue, ground tissue, vascular tissue, dermal tissue, seed, leaf, root, frond, shoot, stem, flower, fruit, stolon, bulb, tuber, corm, kelkis, shoot, bud. According to a particular embodiment, the seed or frond is inoculated with the bacteria of the present invention. For example, the bacteria of the present invention may be coated onto the surface of a seed. In another embodiment, the root may be inoculated with the bacteria of the present invention. In yet another embodiment, the plant may be inoculated by the bacteria of the present invention by foliar application.

The bacteria are disposed on an exterior surface of, or within the plant in an amount effective to increase the amount of vitamin B12 in the plant. The bacterial population is considered exogenous to the plant if that particular plant does not inherently (i.e. in its natural state) contain the population of bacteria.

Following inoculation, the plant or part thereof (e.g. seed) may be grown for at least 3 days, one week, two weeks, three weeks, four weeks, five weeks, six weeks, seven weeks, eight weeks, nine weeks, ten weeks or more.

In one embodiment, the growing is effected under water limiting conditions or under abiotic stress conditions.

In another embodiment, the growing is effected in a disease-endemic area.

Successful colonization can be confirmed by detecting the presence of the bacterial population within the plant. For example, after applying the bacteria to the seeds, high titers of the bacteria may be detected in the roots and shoots of the plants that germinate from the seeds. The presence and quantity of the microbe can also be established using other means known in the art, for example, immunofluorescence microscopy using microbe specific antibodies, or fluorescence in situ hybridization (see, for example, Amann et al. (2001) Current Opinion in Biotechnology 12:231-236, incorporated herein by reference in its entirety). Alternatively, specific nucleic acid probes recognizing conserved sequences from the endophytic bacterium can be employed to amplify a region, for example by quantitative PCR, and correlated to CFUs by means of a standard curve.

The amount of vitamin B12 in the plant may be analyzed using methods known in the art and include for example TLC, HPLC, and/or LC/MS-MS. Other methods of estimating the amount of vitamin B12 are known in the art including the recognized B12 determination method for foods (AOAC952.20), which uses turbidometry to compare the growth response of a sample utilizing the bacterium *Lactobacillus Delbrueckii* against the growth response to a B12 standard.

The present invention further contemplates processed products comprising the plants with enhanced vitamin B12. Exemplary processed products contemplated by the present invention include edible products such as shakes, nutritional bars, flour, dough, soups, yoghurt, smoothies.

As mentioned, in order to obtain plants having increased amounts of vitamin B12, the plants are inoculated with the disclosed bacteria.

Thus, according to another aspect of the present invention there is provided a method of increasing the amount of vitamin B12 in a plant comprising:

(a) applying to the plant an effective amount of *Rhizobium* bacteria which comprise a nucleic acid sequence at least 99% identical to the nucleic acid sequence as set forth in SEQ ID NO: 1; and (b) growing said plant, thereby increasing the amount of vitamin B12 in the plant.

It will be appreciated that the plant can be inoculated directly or the medium in which the plant is situated (e.g. water, earth etc.) may be inoculated instead (or as well as).

The *Rhizobium* bacteria may be any of the bacterial strains described herein.

The *Rhizobium* bacteria may be applied to the plant using any method including, but not limited to spraying, immersing, coating, encapsulating and dusting.

The plant is typically grown for a length of time such that required levels of vitamin B12 are obtained. The growing period may be at least 3 days, one week, at least two weeks, at least three weeks, at least four weeks, at least 5 weeks, at least 6 weeks, at least seven weeks or longer.

The growing may take place in any location. In particular, when the plant is an aquatic plant, the growing may take place in pool, a channel, an aquarium, a fermenter, a bioreactor and/or cobbles.

The plant or processed product may be effective at treating or preventing a medical condition associated with reduced levels of vitamin B12.

Thus, according to still another aspect of the present invention there is provided a method of preventing or treating a disease associated with a low level of vitamin B12 in a subject comprising administering to the subject a therapeutically effective amount of the plant or the processed product disclosed herein, thereby treating the disease.

Such diseases include for example, anemia, including pernicious anemia; nerve degeneration, typically as a result of degradation or lack of myelin; and infestation by intestinal parasites or bacteria such as *Diphyllobothrium latum* (fish tapeworm) that absorb large quantities of vitamin B12 in the host. Other indications for application of the treatment methods disclosed herein include, for example, maintenance of normal hematologic status in pernicious anemia patients in remission subsequent to intramuscular vitamin B12 injection therapy and who have no nervous system involvement; remedying vitamin B12 dietary deficiencies (e.g., in vegetarians); treatment of patients suffering from vitamin B12 malabsorption phenomena such as that resulting from inadequate secretion and/or utilization of intrinsic factor (e.g., due to HIV infection, AIDS, Crohn's disease, tropical and nontropical sprue, extensive neoplasia, subtotal or total gastrectomy, etc.); maintenance of vitamin B12 in excess of normal dietary requirements due to pregnancy, renal disease, thyrotoxicosis, hemolytic anemia, hemorrhage, etc; and patients having elevated serum homocysteine, cystathionine, methylmalonic acid and/or 2-methylcitric acid levels.

The present invention is directed particularly to the treatment of humans in need of vitamin B12 therapy. However, it should be understood that the methods disclosed herein are generally applicable to the treatment of mammals including, for example, domesticated house pets, such as dogs and cats, as well as farm animals, such as cattle, pigs, horses, sheep and goats.

The plant is typically ingested in sufficient quantities so as to increase the levels of vitamin B12 in the subject.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

When reference is made to particular sequence listings, such reference is to be understood to also encompass sequences that substantially correspond to its complementary sequence as including minor sequence variations, resulting from, e.g., sequencing errors, cloning errors, or other alterations resulting in base substitution, base deletion or base addition, provided that the frequency of such variations is less than 1 in 50 nucleotides, alternatively, less than 1 in 100 nucleotides, alternatively, less than 1 in 200 nucleotides, alternatively, less than 1 in 500 nucleotides, alternatively, less than 1 in 1000 nucleotides, alternatively, less than 1 in 5,000 nucleotides, alternatively, less than 1 in 10,000 nucleotides.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, C T (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839, 153; 3,850,752; 3,850,578; 3,853,987; 3,867,517; 3,879, 262; 3,901,654; 3,935,074; 3,984,533; 3,996,345; 4,034, 074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Isolation of *Rhizobium* from *Wolffia globosa* 'Mankai'

Materials and Methods

Mankai™ was harvested from an outdoor cultivation basin, washed for 2 minutes with tap water and vacuum for 1 minute to remove excess water. The biomass was disinfected as follows: 25 g of biomass plant was transferred to 500 ml plastic bottle with 125 ml of 7% $H_2O_2$ solution (Fisher Chemicals, UK) and placed in a laboratory rotator for 5 minutes. The solution was discarded and the biomass was washed twice with 125 ml of sterile water for 1 min while rotating gently. About 30 mg of plant biomass were then transferred to a sterile 1.5 ml tube, crushed with plastic pestle in 100 μl phosphate buffer and 30 μl were plated on a plate count agar (standard methods agar, Himedia, India) on a petri dish and incubated for 72 hours at 30° C. The isolated bacterial clone grown on the plate was sent for 16S sequence analysis (Hy Laboratories Ltd, Israel) and the sequence analysis classified it as a member of the *Rhizobium* genus.

Results

To identify the *Rhizobium* species, a region of 1418 bp of the 16S gene was sequenced and a Blast search did not reveal a 100% homology to any known species. The closest strains were *Ensifer adhaerens* (98%), and *Sinorhizobium kostiense* (97.3%). Based on the sequence similarity analysis, this Mankai™ associated bacteria strain, could be readily distinguished from its closest relatives and represents a novel species of the genus *Rhizobium*. The novel species was named *R. hinomanis*.

Example 2

Growth Dynamics of *R. hinomanis* and *E. coli* in the Presence of Plant Extract Materials and Methods To study *R. hinomanis* growth conditions and to support the hypothesis that it is indeed, a plant endophyte, the growth dynamics of the *R. hinomanis* was determined with or without plant extract and compared with a non-endophyte bacterium such as *E. coli* (K12). The procedure was performed as follows: *R. hinomanis* from glycerol stock was cultivated for 2 hours at 30° C. in Luria Broth (LB) rich media (Neogen, USA). 2 μl of the bacterial growth solution were added to each well of 96 well plate with 200 μl of three different growth mediums (in triplicates): 1. Hoagland medium (plant growth medium) containing: $MgSO_4 \cdot 7H_2O$ 0.246 g/L, $Ca(NO_3)_2 \cdot 4H_2O$ 542 mg/L, $KH_2PO_4$ 68 mg/L, $KNO_3$ 250 mg/L, FeNa·EDTA 37 mg/L, $H_3BO_3$ 1.5 mg/L, $MnCl_2 \cdot 4H_2O$ 9.1 mg/L, $ZnSO_4 \cdot 7H_2O$ 0.11 mg/L, $Na_2MoO_4 \cdot 2H_2O$ 0.045 mg/L, $CuSO_4 \cdot 5H_2O$ 0.045 mg/L, and 0.5% Sucrose. All materials purchased from Fisher Scientific, UK. 2. Hoagland medium supplemented with 10% Mankai™ extract. This extract was obtained by mixing 50 g fresh Mankai™ with 200 ml of 10 mM $MgSO_4$ in a blender (Ninja, BL642IS, China) for 45 seconds. The solution was then centrifuged at 15000RCF/20 min/4° C. and the supernatant was filtered sequentially through 5 μm, 0.45 μm and 0.22 μm filters. 3. Hoagland medium supplemented with 0.5% Casamino acids (BD San Jose, CA). OD600 of each well was then read by a plate reader (Infinite 200pro, Tecan, Austria) every hour for 72 hours while incubating at 30° C. with shaking.

Results

Figure 1A:
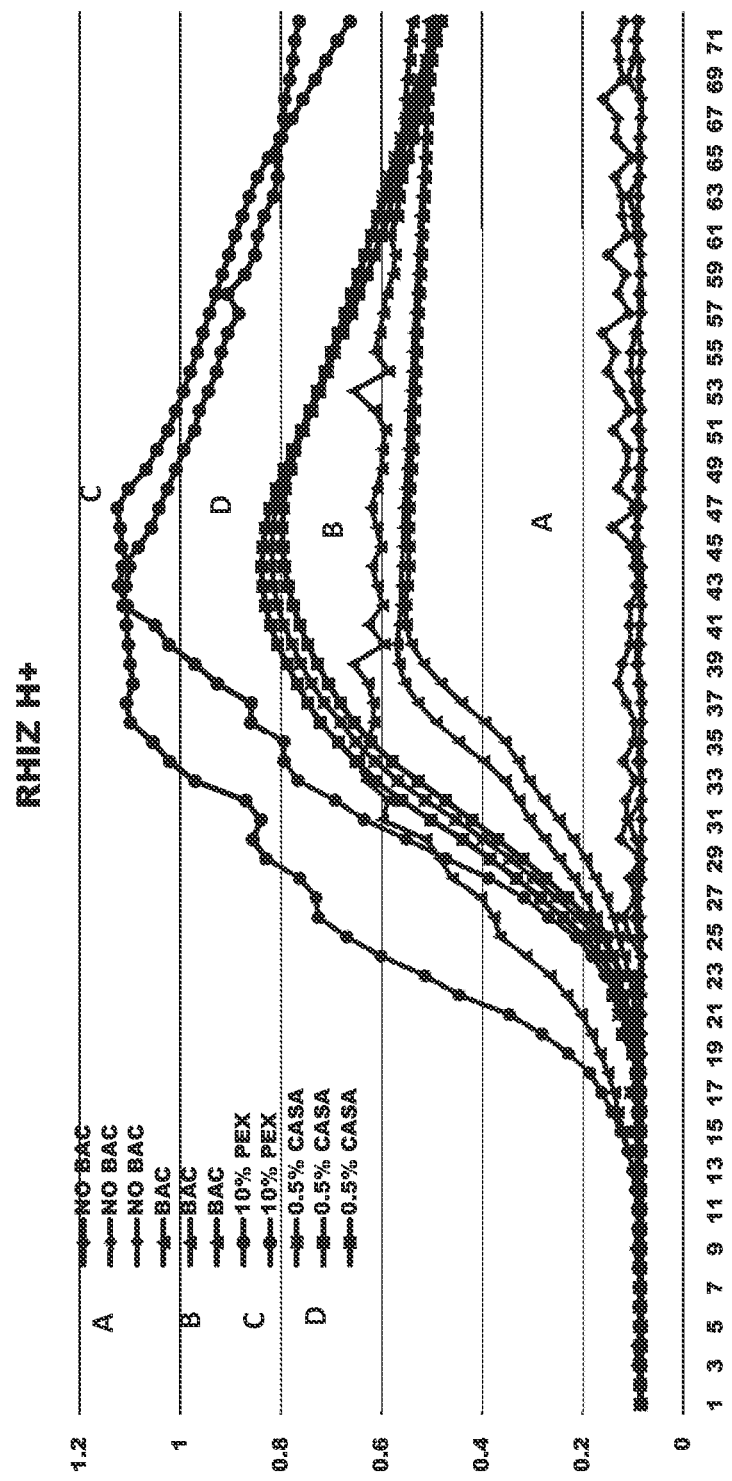

The results shown in FIGS. 1A-B demonstrate that the growth of *R. hinomanis* was enhanced by the presence of plant extract (OD600=1.1) compared with Hoagland medium (OD600=0.6) and Hoagland medium supplemented with 0.5% Casamino acids (OD600=0.8). In contrast, *E. coli* which is not a plant endophyte, grew well in Hoagland medium supplemented with 0.5% Casamino acids (OD600=0.8), but not in the presence of plant extract (OD600=0.3), indicating that *R. hinomanis* is indeed a plant endophyte.

Example 3

Vitamin B12 Production of *Rhizobium hinomanis*

Materials and Methods

To determine whether *R. hinomanis* has the ability to produce vitamin B12, a culture was grown in a B12 free medium. Hoagland medium supplemented with 0.5% sucrose met these requirements. Analytical results to verify the absence of B12 in this medium was done three times to validate that the level of B12 is below the detection level (<0.03 μg/100 g) by microbiological assay performed by Bactochem laboratories Ltd. (Ness Ziona, Israel). *R. hinomanis* culture was grown in Hoagland medium supplemented with 0.5% sucrose and the levels of the vitamin were determined by the vitamin B12 microbiological assay. The procedure was performed as follows: *R. hinomanis* from glycerol stock was cultivated for 2 hours at 30° C. in LB and then diluted 1:100 in 200 ml B12-free Hoagland solution supplemented with 0.5% sucrose that was divided into two 250 ml Erlenmeyer flasks. *R. hinomanis* was cultivated for 72 hours at 120 rpm shaking, to stationary phase and the culture was centrifuged for 10 minutes at 10000 rpm. The bacterial pellet was washed twice with Hoagland solution and 1 g was used to determine B12 levels by the official B12 determination method for foods (AOAC952.20), using turbidometry to compare the growth response of a sample utilizing the bacterium *Lactobacillus Delbrueckii* against the growth response to a B12 standard [5]. This microbiological assay was performed by the Vitafast kit (r-biopharm, Germany), according to the manufacturer's instructions. Briefly, the sample was powdered by the use of a mortar and pestle and 1 g was added to 20 ml of acetate buffer, pH 4.5, and homogenized with vortex for 30 seconds. Total vitamin B12 was extracted from the homogenates by the method of boiling with KCN at acidic pH [6]. Specifically, 250 μl of 1% KCN solution (Merck, Germany) and 300 mg of Taka diastase (Sigma-aldrich, USA) were added to the homogenates, which were incubated at 30° C. for 1 hour. Then volume was topped up to 40 ml by acetate buffer and the samples were incubated for 30 min at 95° C. in the dark. These homogenates were centrifuged at 10000 g for 10 minutes. The supernatant was filtered and then used for the microbiological assay in 96 well plate with lyophilized *Lactobacillus Delbrueckii* vitamin B12 dependent bacterium, according to the manufacturer's instructions.

Results

This procedure was performed in three independent experiments and the results summarized in Table 1 show that the average B12 level was 256 μg/100 g bacterial pellet.

TABLE 1

Vitamin B12 levels of *R. hinomanis* grown in a B12 free medium (Hoagland medium supplemented with 0.5% sucrose). Results of three independent experiments are shown.

| *R. hinomanis* sample # | B12 level (μg/100 g bacterial pellet) |
|---|---|
| 1 | 234.190 |
| 2 | 262.419 |
| 3 | 272.403 |
| No bacteria | <0.03 |

Example 4

Validation of Vitamin B12 Production by *Rhizobium hinomanis*

Materials and Methods

To validate that *R. hinomanis* produces the active form of vitamin B12, the bacterium was grown as described above and the bacterial B12 extraction solution was analyzed by ultra-performance liquid chromatography with C18-column coupled to a triple quadrupole mass spectrometer (UPLC-MS/MS, Waters I-Class Acquity UPLC coupled to a Waters Xevo TQ-S) as follows: the sample extracts (pH adjusted to 7.0 with aqueous ammonia at stirring) were loaded on Immunoaffinity columns (R-Biopharm, Germany) and washed with 10 ml of DDW. Weak vacuum was applied to dry the columns, and cyanocobalamin was collected by slow eluting 3.5 ml methanol. After evaporation of methanol in speedvac the samples were re-dissolved in 100 uL of 0.05% aqueous formic acid, centrifuged (21,000 g×10 minutes), and the supernatants were used for the analysis by ultra-high pressure LC coupled to a triple quadrupole mass spectrometer (Waters I-Class Aquity UPLC coupled to a Waters XevoTQS).

Results

The results revealed the presence of genuine vitamin B12 (cyanocobalamin) in the sample: peaks in the sample and standard cyanocobalamin (Sigma V2876) solutions have the same retention times and very similar ratio of intensities for four multiple-reaction monitoring (MRM) transitions based on characteristic molecular mass (m/z 678.5 where z=2) of genuine vitamin B12 (cyanocobalamin) as shown in FIG. 2. According to HPLC quantification the sample contained 128.6 μg/100 g bacterial pellet which, as expected is lower that the microbiological assay results due to loss of vitamin B12 during the preparation for the UPLC-MS/MS and due to the fact that in this method only the cyanocobalamin form of B12 was detected.

Example 5

Vitamin B12 Production in *Rhizobium hinomanis* and *Pseudomonas denitrificans*

Materials and Methods

To assess the potential vitamin B12 production ability of the novel *Rhizobium hinomanis* bacteria, a comparison to *Pseudomonas denitrificans* (ATCC7830), that is used in the B12 industry, was performed. *R. hinomanis* and *P. denitrificans* from glycerol stock was cultivated for 16 hours at 30° C. in LB. Turbidity at OD600 was measured and inoculum was diluted to bacterial density of OD600=0.2. Both bacteria were then diluted 1:100 in 300 ml B12-free Hoagland solution supplemented with 0.5% sucrose and 0.5% Casamino acids in Erlenmeyer flasks. *R. hinomanis* was cultivated for 72 hours and *P. denitrificans* for 24 hours at 120 rpm shaking, to stationary phase. A 1 g bacterial pellet was collected by centrifuging for 10 minutes at 10000 rpm. The pellet was subsequently washed with sterile Hoagland solution and excess liquid discarded. The pellets were stored at −80° C. until a microbiological B12 assay was performed. The B12 analysis results are provided in the table below:

TABLE 2

Comparison of Vitamin B12 levels of *R. hinomanis* and *Pseudomonas denitrificans* cultured in a B12 free medium.

| Sample | Culture volume (ml) | Testing pellet size, (g) | B12 level (μg/100 g) | B12 level adjusted to 1 gram pellet (μg/100 g) |
|---|---|---|---|---|
| *Pseudomonas denitrificans* | 300 | 1 | 91.93 | 91.928 |
| *Rhizobium hinomanis* | 400 | 0.35 | 103.29 | 295.126 |

Example 6

Vitamin B12 Enrichment by Co-Culturing Duckweed with *Rhizobium hinomanis*

Materials and Methods

A starter of the isolated bacteria, *Rhizobium hinomanis*, was grown at 30° C. over night in 2 ml LB media. Growth was continued by diluting the starter solution 1:100 with Hoagland solution containing 0.5% Casamino acid and culturing for an additional 48 hours under the same conditions.

A culture of *Wolffia globosa* 'Mankai' grown indoors at 25° C., 18 h light and light intensity of 250 μE m$^{-2}$ s$^{-1}$, served as the starter biomass for the experiment.

Mankai™ biomass was placed in large petri plates (15 cm diameter) and divided into 2 treatment groups, with 3 replicates in each:

A) Co-culture of Mankai™ and *R. hinomanis* with the addition of 0.01 ppm Cobalt B) Control—Mankai™ with no bacteria or cobalt addition.

70 mg of Mankai™ biomass was put in each large Petri dish with 100 ml growth media. 1 ml of the *R. hinomanis* culture was added to the 100 ml growth media (without Casamino acid) and the co-culture was cultured under growth conditions of 25° C., 18 h light and light intensity of 250 µE m$^{-2}$ s$^{-1}$, for 16 days. Full media replacements were performed every 5 days, while no additional bacteria solution was added.

At the end of the culture period, all culture dishes reached at least 3 g plant biomass, resembling a 5 fold duplication, with no exceptions. The harvested Mankai™ biomass from each treatment was thoroughly washed with deionized water, lyophilized, and subjected to vitamin B12 Bioassay analysis using the Vitafast B12 microbiological assay kit (R-Biopharm, AG, Darmstadt, Germany) according to the Manufacturer's instructions.

The Vitamin B12 results (FIG. 3) revealed an increase of more than ×3 times in B12 level in the biomass produced by the co-culture of Mankai with *R. hinomanis* (6.3 µg/100 g Dry matter base), versus the control (2.1 µg/100 g Dry matter base).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

REFERENCES

1. Zelicha, H., et al. (2019). The Effect of *Wolffia globosa* Mankai, a Green Aquatic Plant, on Postprandial Glycemic Response: A Randomized Crossover Controlled Trial. *Diabetes Care* 42, 1162-1169.
2. Yaskolka M., et al. (2019). A Green-Mediterranean Diet, supplemented with Mankai Duckweed, Preserves Iron-Homeostasis in Humans and Is Efficient in Reversal of Anemia in Rats. *J Nutr.* 1; 149(6).
3. Kaplan A., et al. (2018). Protein bioavailability of *Wolffia globosa* duckweed, a novel aquatic plant, —A randomized controlled trial. *Clin Nutr*. Epub, December 11.
4. M. O. Burton and A. G. Lochhead (1952). Production of vitamin B12 by *rhizobium* species. *Canadian Journal of Botany*, 30(5): 521-524.
5. Latimer, G., Horowitz, W. (2001). Official Methods of Analysis of AOAC International, 18th ed.; AOAC Intl: Gaithersburg, MD, USA.
6. Frenkel, E. P., Prough, R., Kitchens, R. L. (1980). Measurement of tissue vitamin B12 by radioisotopic competitive inhibition assay and a quantitation of tissue cobalamin fractions. Methods Enzymol., 67, 31-40.
7. Watanabe F., et al. (2013). Biologically active vitamin B12 compounds in foods for preventing deficiency among vegetarians and elderly subjects. *Agric Food Chem.* 17; 61(28):6769-75.
8. Watanabe F. & Bito T. J. (2018). Determination of Cobalamin and Related Compounds in Foods. *AOAC Int.* 1; 101(5):1308-1313.

What is claimed is:

1. A lyophilized bacterial culture consisting of *Rhizobium* bacteria having a nucleic acid sequence at least 99% identical to SEQ ID NO: 1 and an agriculturally acceptable carrier selected from the group consisting of a stabilizer, a tackifier, a preservative, a surfactant, an anti-complexing agent, an acaricide, a fungicide, an insecticide, a nematicide, a pesticide, a plant growth regulator, a fertilizer, a rodenticide and a combination thereof.

2. A plant or part thereof inoculated with the bacterial culture of claim 1.

3. The plant of claim 2, wherein the plant is a crop plant.

4. The plant of claim 3, wherein said crop plant is a cultivated crop plant.

5. The plant of claim 2, wherein said plant is a monocot.

6. The plant of claim 2, wherein said plant is a dicot.

7. The plant of claim 2, being of the Lemonoideae subfamily.

8. A method of increasing the amount of vitamin B12 in a plant, the method comprising:
   (a) providing a plant of the Lemonoideae subfamily grown in a liquid culture;
   (b) adding to the culture an effective amount of *Rhizobium* bacteria having a nucleic acid sequence at least 99% identical to the nucleic acid sequence as set forth in SEQ ID NO: 1 and cobalt as a free salt or ion so as to increase an amount of vitamin B12 in the plant.

9. A method of producing food comprising:
   (a) providing a plant of the Lemonoideae subfamily grown in a liquid culture;
   (b) adding to the culture an effective amount of *Rhizobium* bacteria having a nucleic acid sequence at least 99% identical to the nucleic acid sequence as set forth in SEQ ID NO: 1 and cobalt as a free salt or ion so as to increase an amount of vitamin B12 in the plant; and
   (b) formulating the plant into food.

\* \* \* \* \*

SEQUENCE LISTING

```
<160> NUMBER OF SEQ ID NOS: 1

<210> SEQ ID NO 1
<211> LENGTH: 1418
<212> TYPE: DNA
<213> ORGANISM: Artificial Sequence
<220> FEATURE:
<223> OTHER INFORMATION: 16s nucleic acid sequence

<400> SEQUENCE: 1
tgttacgact tcaccccagt cgctgaccct accgtggtta gctgcctcct tgcggttagc      60
gcactacctt cgggtaaaac caactcccat ggtgtgacgg gcggtgtgta caaggcccgg     120
gaacgtattc accgcagcat gctgatctgc gattactagc gattccaact tcatgcactc     180
gagttgcaga gtgcaatccg aactgagatg gcttttggag attagctcga cctcgcggtc     240
tcgctgccca ctgtcaccac cattgtagca cgtgtgtagc ccagcccgta agggccatga     300
ggacttgacg tcatccccac cttcctctcg gcttatcacc ggcagtcccc ttagagtgcc     360
caactgaatg ctggcaacta agggcgaggg ttgcgctcgt tgcgggactt aacccaacat     420
ctcacgacac gagctgacga cagccatgca gcacctgtct ccggtccagc cgaactgaag     480
gtatccatct ctggaaaccg cgaccgggat gtcaagggct ggtaaggttc tgcgcgttgc     540
ttcgaattaa accacatgct ccaccgcttg tgcgggcccc cgtcaattcc tttgagtttt     600
aatcttgcga ccgtactccc caggcggaat gtttaatgcg ttagctgcgc caccgaacag     660
taaactgccc gacggctaac attcatcgtt tacggcgtgg actaccaggg tatctaatcc     720
```

```
tgtttgctcc ccacgctttc gcacctcagc gtcagtaatg gaccagtaag ccgccttcgc      780
cactggtgtt cctgcgaata tctacgaatt tcacctctac actcgcaatt ccacttacct      840
cttccatact ctagacaccc agtatcaaag gcagttccga ggttgagccc cgggatttca      900 ccctgactt aaatgtccgc ctacgtgcgc tttacgccca gtaattccga acaacgctag       960 ccccttcgt attaccgcgg ctgctggcac gaagttagcc ggggcttctt ctccggttac      1020
cgtcattatc ttcaccggtg aaagagcttt acaaccctaa ggccttcatc actcacgcgg     1080
catggctgga tcaggcttgc gcccattgtc caatattccc cactgctgcc tcccgtagga    1140
gtttgggccg tgtctcagtc ccaatgtggc tgatcatcct ctcagaccag ctatggatcg    1200
tcgccttggt aggcctttac cccaccaact agctaatcca acgcgggcca atccatcacc    1260
gataaatctt tcacctctcg gtcgtatacg gtattagcac aagtttccct gagttattcc    1320
gtagtgatgg gtatgttccc acgcgttact cacccgtctg ccactcccct tgcggggcgt   1380
tcgacttgca tgtgttaagc ctgccgccag cgttcgtt                             1418
```